United States Patent
Moons

(10) Patent No.: US 8,369,233 B2
(45) Date of Patent: Feb. 5, 2013

(54) LANE SYNCHRONISATION

(75) Inventor: Marc Maria Moons, Hamilton (NZ)

(73) Assignee: Endace Technology Limited, Ellerslie, Auckland (NZ)

( * ) Notice: Subject to any disclaimer, the term of this patent is extended or adjusted under 35 U.S.C. 154(b) by 303 days.

(21) Appl. No.: 12/244,076

(22) Filed: Oct. 2, 2008

(65) Prior Publication Data

US 2010/0085873 A1   Apr. 8, 2010

(51) Int. Cl.
*H04L 12/26* (2006.01)

(52) U.S. Cl. .................................................. 370/252

(58) Field of Classification Search .................. 370/252, 370/360, 350, 329, 247, 267, 384
See application file for complete search history.

(56) References Cited

U.S. PATENT DOCUMENTS

| 6,985,502 B2 | 1/2006 | Bunton | |
|---|---|---|---|
| 7,010,607 B1* | 3/2006 | Bunton | 709/228 |
| 2006/0156176 A1* | 7/2006 | Kisela et al. | 714/758 |

* cited by examiner

*Primary Examiner* — Man Phan
*Assistant Examiner* — Nourali Mansoury
(74) *Attorney, Agent, or Firm* — Greer, Burns & Crain, Ltd.

(57) ABSTRACT

A method of monitoring a plurality of transmission lanes in a data transmission system includes the step of extracting individual lane parameters in the data transmission system independently of a transmitted training sequence.

12 Claims, 4 Drawing Sheets

4x Packet Formats

LANE SYNCHRONISATION

TECHNICAL FIELD

The present invention relates to a method of monitoring transmissions in a data transmission system, and in particular to monitoring multilane data transmission between nodes in a computing network.

BACKGROUND OF THE INVENTION

System Area Networks (SANs) have been developed in which one or more processor nodes are connected to one or more I/O nodes through a fabric of switches and routers.

InfiniBand™ (IB) is an example of a system architecture providing a common I/O specification in a channel based, switched-fabric technology.

High density data links between the various processor nodes, switches, routers and I/O nodes in an IB SAN typically involve parallel transmission of data over a plurality of serial connections ("parallel-serial" links). Each link can include a number of physical lanes (e.g., copper cable or fibre optic cable). Typical multi-lane IB links can have 4, 8 or 12 physical lanes per link (denoted 4×, 8× and 12× respectively), although in principle a link may have any number of lanes.

The standard serial signalling rate is 2.5 Gbits/s (Single Data Rate, SDR) in each direction per connection. IB currently also supports double (DDR) and quad (QDR) data rates. Data in an IB system uses the industry standard 8B/10B encoding (i.e., every 10 bits carries 8 bits of data). Therefore, a 4× QDR link can carry 32 Gbits/s of useful data.

Each 10 bit entity is known as a symbol or character. Data symbols are commonly denoted Dx.y, where x ranges from 0 to 31 and y from 0 to 7. The 8B/10B standard also defines a number of control symbols, denoted by Kx.y, that can be sent in place of data symbols.

A data or link packet sent over a link is an ordered sequence of control symbols and data symbols. For example, a data packet always begins with a Start of Data Packet symbol (SDP (K27.7)) and ends with an End of Data Packet symbol (EGP (K29.7) or EBP (K30.7) depending on whether or not the packet loses integrity during transmission through the fabric). A similar system is used with link packets using SLP (K28.2) and EGP/EBP control symbols. Other control and data symbols are inserted between the SDP and EGP (or EBP) symbols, the data being byte striped across the lanes, usually sequentially.

In order to establish (or re-establish) a link between nodes over a multi-lane link it is necessary to establish the corresponding lane order and polarity of each of the lanes of the multi-lane ports at both the transmitting and receiving nodes. This is typically achieved by a process of link training. During link training an ordered set of symbols, known as a Training Sequence (TS1 or TS2) is transmitted over the link.

TS1 and TS2 contain sufficient information to enable a port receiving it to establish both the correct lane order and polarity to match the lane order and polarity of the transmitting port for each of the lanes in the link. A two way link is established (link "up") when a port's receiver has been correctly configured (using TS1 and TS2) and the port is both receiving and transmitting Idle symbols.

A method of lane alignment in a multi-lane transmission system utilising training sequences, together with a detailed description of the InfiniBand™ system, is disclosed in U.S. Pat. No. 6,985,502 (to Bunton), the disclosure of which is incorporated here by way of reference.

Through the exchange of training sequences, such as TS1 and TS2, a link can be established for a node within an IB SAN. However, there can be occasions when it is important to monitor the flow of information through the SAN without establishing a new link. For example, an operator of a SAN may wish to monitor the performance of the SAN without disturbing the network by adding new nodes and links.

Network monitoring systems, such as Endace™'s DAG™-based system, use a passive tap to read the packets as they are transmitted over a link. While this is relatively straightforward in a single lane link, the information in a packet transmitted over a multi-lane IB link is meaningless without knowledge of the lane alignment and polarity of each lane.

One method of establishing the correct lane alignment and polarities is to wait until a training sequence is transmitted over the link. The training sequence can be readily recognised and used to set up the appropriate lane order and polarities.

However, this is not practical in general as transmission of training sequences typically only occurs when a link is being established or re-established, which can be an infrequent occurance. Monitoring of high performance computing networks, such as those using multi-lane IB technology, requires that access to the information flowing along the link be as rapid as possible. In such cases it would be an advantage to have a method of lane alignment which could be applied at any time.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

SUMMARY OF THE INVENTION

According to one aspect of the present invention there is provided a method of monitoring a plurality of transmission lanes in a data transmission system, characterised by the step of extracting individual lane parameters in the data transmission system independently of a transmitted training sequence.

In a preferred embodiment the data transmission system includes a plurality of transmission lanes in a parallel-serial architecture.

Reference throughout this specification to a parallel-serial architecture should be understood to refer to a link in which a plurality of physical lanes form serial connections, with information transmitted over each of the serial connections at substantially the same time.

In a preferred embodiment there are four transmission lanes.

The method of the present invention may be used with any number of transmission lanes and reference to four transmission lanes only throughout this specification should not be seen as limiting.

A typical link in a multi-lane transmission system of the type consider here, such as the InfiniBand™ system, uses four reception and four transmission lanes, denoted 4×, or a multiple thereof (8×, 12× etc). The lanes of a multi-lane link are conventionally labelled sequentially beginning with 0. Hence, a 4× link has physical lanes labelled 0, 1, 2, and 3.

Reference to lane parameters throughout this specification should be understood to mean the physical lane identifier and the polarity of a lane.

Reference to a training sequence throughout this specification should be understood to refer to a specific sequence of control and data symbols that is transmitted over a link when the link is established or re-established in order to establish the lane parameters for the link (ie, correlation of the lane parameters of the transmitting and receiving nodes of a link).

According to another aspect of the present invention there is provided a method of determining the lane parameters of a plurality of transmission lanes in a data transmission system, the method including the steps of:
  a) receiving a packet transmitted over the plurality of transmission lanes, the packet including a start of packet delimiter, an end of packet delimiter and an error detecting code;
  b) assigning a first lane identifier to the reception lane that received the start of packet delimiter according to a preset protocol for the data transmission system;
  c) assigning a second lane identifier to the reception lane that received the end of packet delimiter according to a preset protocol for the data transmission system;
  d) assigning a unique lane identifier to each of the remaining reception lanes;
  e) assigning a lane polarity to each of the reception lanes;
  f) calculating an error code utilising the assigned lane identifier and lane polarity for each lane;
  g) comparing the calculated error code with the received error detecting code; and
  h) repeating steps d) to g) until the calculated error code matches the received error detecting code wherein on each iteration the assignment of at least one lane identifier or lane polarity is changed.

According to another aspect of the present invention there is provided a method of determining the lane parameters of a plurality of transmission lanes in a data transmission system substantially as outlined above, wherein step h) includes repeating steps a) to c).

According to another aspect of the present invention there is provided a computer network device configured to monitor a plurality of transmission lanes in a data transmission system, the computer network device configured in use to:
  a) receive a packet transmitted over the plurality of transmission lanes, the packet including a Start of Packet delimiter, an End of Packet delimiter and an error detecting code;
  b) assign a first lane identifier to the reception lane that received the Start of Packet delimiter according to a preset protocol for the data transmission system;
  c) assign a second lane identifier to the reception lane that received the End of Packet delimiter according to a preset protocol for the data transmission system;
  d) assign a unique lane identifier to the remaining transmission lanes;
  e) assign a lane polarity to each of the transmission lanes;
  f) calculate an error code utilising the assigned lane identifier and lane polarity for each lane; and
  g) compare the calculated error code with the received error detecting code; and change at least one lane identifier of the said remaining reception lanes or one lane polarity if the calculated error code does not match the received error detecting code.

Information may be transmitted over a 4× link in the form of a packet. A packet may be a data packet or a link packet. In each case data is byte striped onto the four lanes with each packet beginning with a Start of Packet delimiter (SDP or SLP) and ending with an End of Packet delimiter (EGP or EBP).

In a preferred embodiment the preset protocol requires the Start of Packet delimiter is transmitted in a transmission lane having a prescribed physical lane identifier.

In a preferred embodiment the preset protocol requires the packet to have a length restricted to a multiple of four bytes.

Preferable the preset protocol corresponds to the InfiniBand protocol. Under the InfiniBand protocol the Start of Packet delimiter (SDP or SLP) is always transmitted in physical lane 0. Furthermore, packet lengths are restricted to multiples of four bytes, so that for a 4× IB system the End of Packet delimiter (EGP or EBP) is always transmitted in physical lane 3.

In a preferred embodiment the error detecting code is a cycle redundancy check (CRC).

A Cycle Redundancy Check (CRC) is an error detecting code that is transmitted with each packet. When the packet is received a calculation is performed based on the information contained in the packet to produce an error code as is well known by those skilled in the art. The error code is compared to the transmitted CRC and, if they do not match, an error is detected.

There are generally two CRCs in each packet, an Invariant CRC (ICRC) that covers all fields that should not change as the packet (including headers etc) traverses the fabric or network, and a Variant CRC (VCRC) that covers all of the fields of the packet.

The combination of the two CRCs allow switches and routers to modify appropriate fields and still maintain an end to end data integrity for the transport control and data portion of the packet.

In a preferred embodiment the error detecting code is a Variant Cycle Redundancy Check (VCRC)

Since ICRC is not present in all IB packets, only VCRC is used to perform CRC validation in the present invention.

In a preferred embodiment the computer network device includes firmware.

An advantage of using firmware is that the VCRC can be checked and the lane parameters set as each packet is received, so that the correct lane parameters for all lanes can be established very quickly.

In a preferred embodiment the firmware is a Field Programmable Gate Array (FPGA).

A FPGA may be programmed to carry out the computation of the error code and to compare it with the transmitted error code, and to change the lane identifier and polarity if required, quickly and efficiently.

In alternative embodiments the computer network device may be a processor and a set of computer executable instructions. However, the applicant has found that a software-based solution may take many seconds to establish the correct lane alignment. With data transmission rates at several Gbits/s this delay means that a considerable amount of data is lost before the correct lane alignment is established.

In practice a high impedance tap may be used to read the symbols in each lane of a packet as it is transmitted over a multi-lane link. The order in which symbols are placed on the lanes when transmitted is determined by the protocol for the particular transmission system.

According to another aspect of the present invention there is provided a method of determining when determination of lane parameters is required and re-establishing determination of the lane parameters of a plurality of transmission lanes in a data transmission system in accordance with the previous method, the method including: the further steps of
i) receiving a packet for which the calculated error code matches the received error code and setting a realign parameter to zero;
j) incrementing the realign parameter by one for each consecutive packet received for which the calculated error code does not match the received error detecting code; and
k) determining the lane parameters for each lane independently of a transmitted training sequence when the value of the realign parameter exceeds a preset threshold value; or
l) resetting the realign parameter to zero if a packet is received for which the calculated error code matches the received error detecting code.

In a preferred embodiment the preset threshold value is 5.

Although any value greater than 1 may be used for the threshold value before initiation of the method of lane alignment, the applicants have found that a value of 5 provides a reasonable indication that re-establishment of the lane alignment is required.

BRIEF DESCRIPTION OF DRAWINGS

Further aspects of the present invention will become apparent from the following description which is given by way of example only and with reference to the accompanying drawings in which:

FIG. 2 shows a flow chart of the steps of a multi-lane alignment method according to one embodiment of the present invention; and.

DETAILED DESCRIPTION OF THE INVENTION

Figure 1:
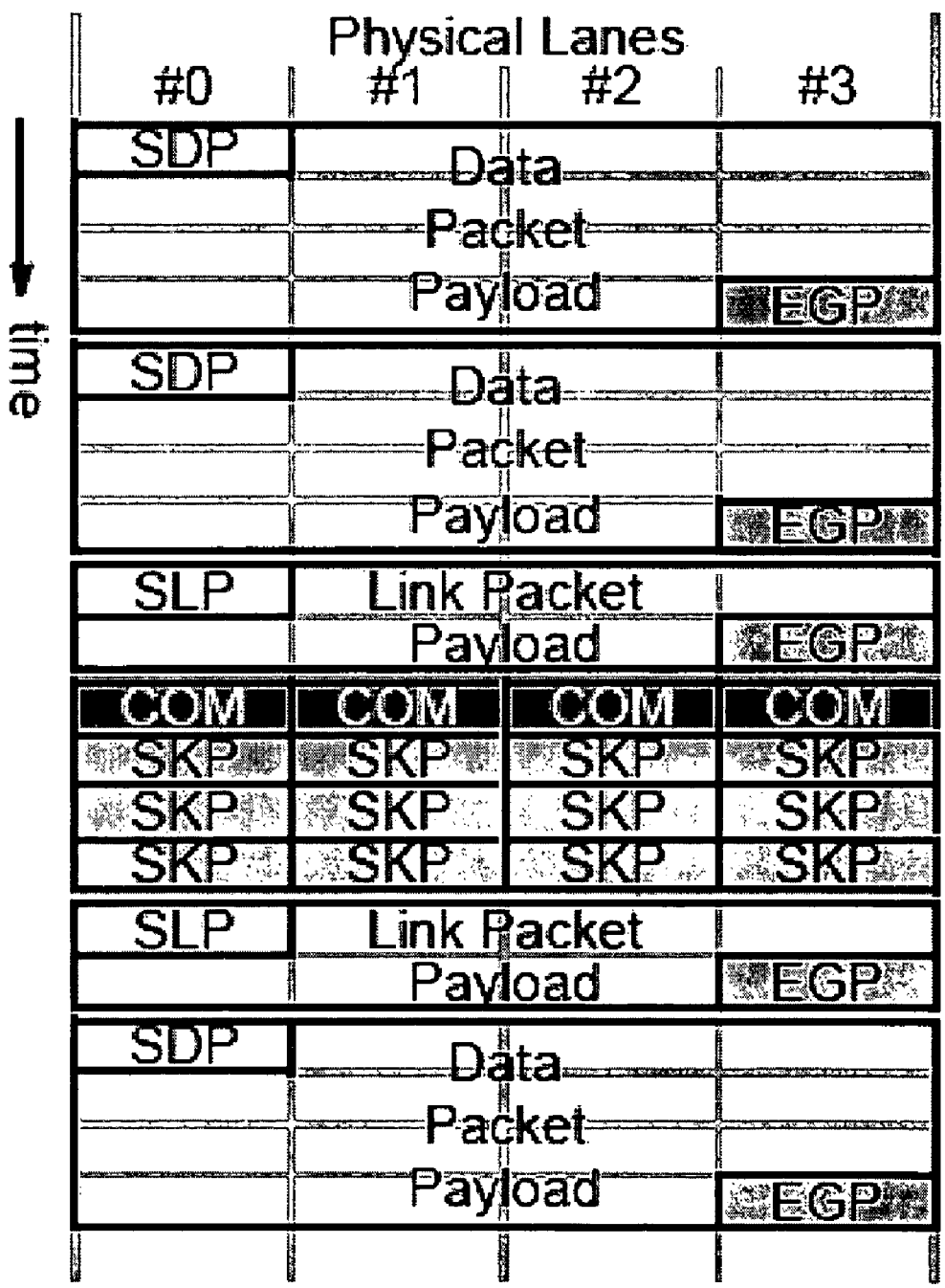
FIG. 1 shows a schematic representation of a sequence of packets.

In order to monitor transmissions on a multi-lane transmission system it is first necessary to establish the lane parameters (physical lane identifier and lane polarity) for each of the transmission lanes. In the method of the present invention this is achieved independently of a transmitted training sequence.

The invention will be illustrated with reference to an Infini-Band™ (IB) 4× link. However, it will be appreciated by those of ordinary skill in the art that the method of the present invention is not limited to InfiniBand™, or to a 4× link, but can be applied to any transmission system using a multi-lane parallel-serial link.

The 4× link between two nodes of an IB network consists of four physical lanes (e.g., copper wire or fibre optic cable) which are conventionally numbered 0 to 3. The combined data and link packet symbol streams (control and data) are byte striped onto the physical lanes 0 to 3.

Data and link control information is transmitted over the IB links in packets that include at least: one or more headers; a payload packet; one or two Cyclic Redundancy Checks (CRCs) and an End of Packet delimiter.

The first symbol of a data packet is a Start of Data Packet Delimiter symbol, SDP (K27.7), which is transmitted to identify the start of a data packet. The first symbol of a link packet is a Start of Link Packet Delimiter symbol, SLP (K28.2), which is transmitted to identify the start of a link control packet.

Packet formatting rules specify which physical lanes may be used by the SDP and SLP control symbols. In the IB protocol SDP and SLP are always transmitted in physical lane 0.

The End of Good Packet Delimiter symbol, EGP (K29.7), is used to mark the end of each packet (when it is transmitted by the originating port). Packet length rules restrict which physical lanes may be used to transmit the EGP control symbol. In an IB system packet lengths are restricted to multiples of 4 bytes. Therefore the EGP delimiter is always transmitted in physical lane 3 of a 4× IB system, but may, for example, be in physical lane 3, 7 or 11 of a 12× IB system.

The End of Bad Packet Delimiter symbol, EBP (K30.7), is used to mark the end of a bad packet forwarded by a switch or router node. When an error (e.g., a CRC error) is detected in a data packet received by a switch or router node, it is marked bad by replacing the original EGP symbol with an EBP packet symbol. An EBP delimiter is always transmitted in the same lane as an EGP delimiter.

Receiving nodes are required to recognize either EGP or EBP as the end of packet delimiter. Any data (or link) packet terminated with an EBP symbol must be treated as if it had a CRC error. In the context of the present invention any received packet terminated with an EBP symbol should be ignored when determining lane alignment or polarity.

A number of other control symbols are commonly used in transmissions in an IB system.

The COMMA control symbol, COM (K28.5), is used by the physical lane receiver logic to identify symbol boundaries and for channel bonding purposes. Comma symbols are required to synchronise the receive logic when links are being trained. The comma symbol is also used as the start of ordered-set delimiter.

The SKIP symbol, SKP (K28.0), is included as part of the SKIP ordered-set used for clock tolerance compensation. A SKIP ordered-set begins with a COM followed by a one or more SKP symbols in each lane. The SKIP ordered-set is not byte striped across the lanes; rather it is transmitted simultaneously on all lanes.

The Padding symbol, PAD (K23.7), is added to the end of a packet (for IB systems having more than 4 lanes) to align the total transmitted packet length with the number of physical lanes. For example, in the case of a 12× IB system the End of Packet delimiter (EGB/EBP) may be transmitted in physical lane 3, 7 or 11, depending on the length of the packet. In this case 8, 4 or 0 PAD symbols respectively are added to the packet so that the total number of symbols transmitted is a multiple of 12.

An IB training sequence (TS1 or TS2) consists of an ordered sequence of symbols beginning with a COM followed by a physical lane identifier data symbol and a number of data symbols unique to the training sequence. The symbols are transmitted simultaneous across the lanes (ie not byte striped), starting with a COM in each lane, followed by a lane identifier for each lane and so on. The information contained in the training sequence is sufficient to determine the lane parameters of the receiving lanes so that they correspond to the lane parameters of the transmission lanes.

FIG. 1 shows a schematic representation of a typical sequence of transmitted packets in a 4× IB system. In the example shown in FIG. 1, two data packets are followed by a link packet, a SKIP ordered-set, a link packet and a data packet. Each packet begins with a Start of Packet delimiter (SDP/SLP) transmitted in physical lane 0, and ends with an End of Packet delimiter (EGB/EBP) transmitted in physical lane 3. Only the Start of Packet delimiters and End of Packet delimiters are shown for each packet in FIG. 1—details of the symbols making up the header, CRCs etc are not shown for simplicity.

Figure 2:
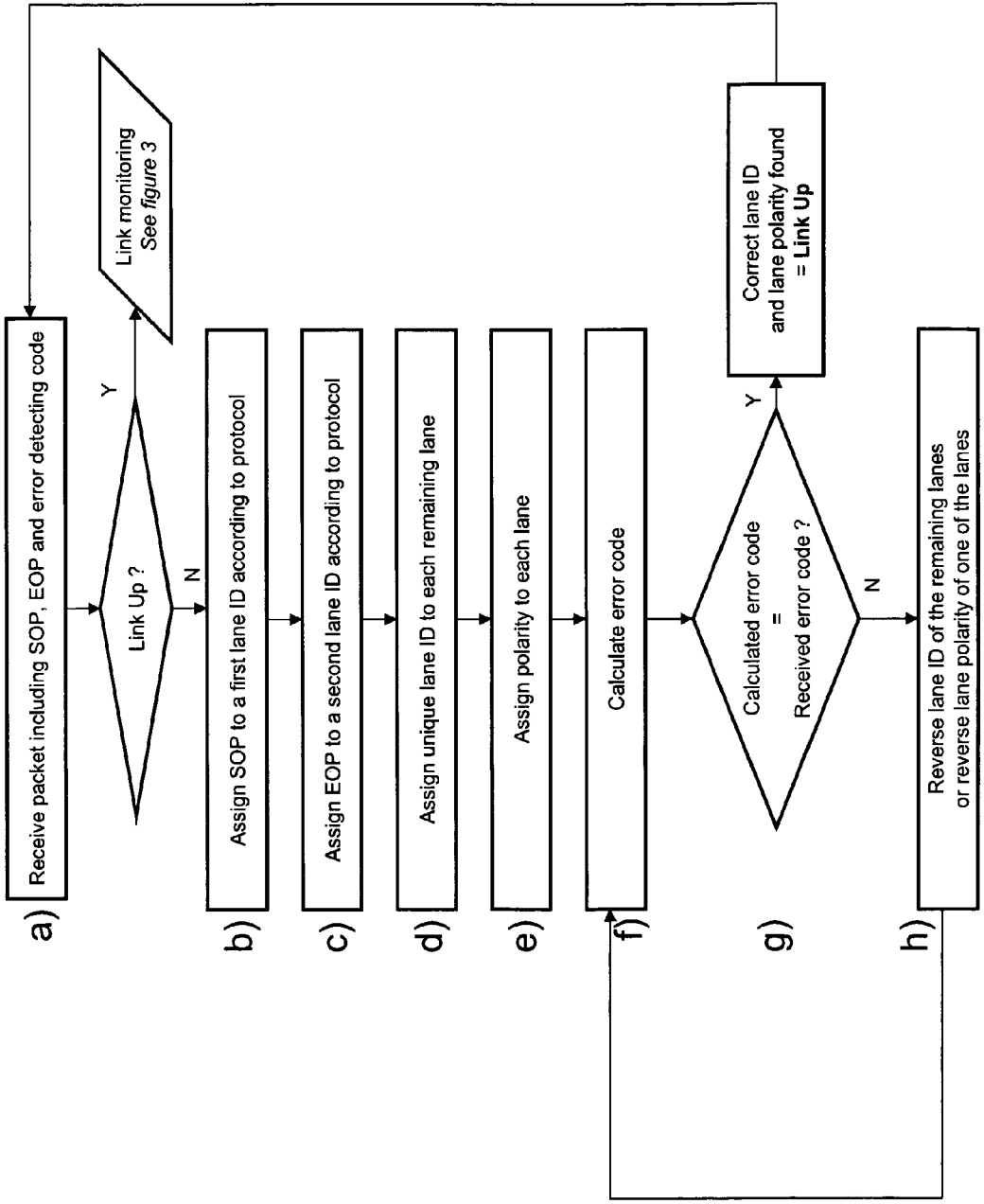

A flow chart of the steps of the method of determining the lane parameters according to one embodiment of the present invention for a 4× IB system is shown in FIG. 2.

In step a) a packet containing a Start of Packet delimiter, End of Packet delimiter and a VCRC, is received. In step b) the lane containing the Start of Packet delimiter (SDP/SLP) is assigned to physical lane 0. In step c) the lane containing the End of Packet delimiter (EGP/EBP) is assigned to physical lane 3. If the End of Packet delimiter is EBP the packet is ignored and the method reverts to step a) for a new packet.

In step d) the remaining two lanes are arbitrarily assigned to physical lanes 1 and 2.

In step e) a polarity (either normal or inverted is assigned to each lane. In step f) an error code is calculated (using methods well know in the art) for the packet using the assigned lane order and polarities The calculated error code is compared with the received VCRC in step g). If the calculated error code agrees with the VCRC then the physical lane identifier and polarity for each lane corresponds to the transmitted lanes and monitoring can commence.

If the calculated error code does not agree with the VCRC then, in step h), steps d) to g) are repeated with either the lane assignment for lanes 1 and 2 reversed, or one of the lane polarities reversed. This process is repeated for each of the 32 possible combinations (16 possible combinations of polarity for the four lanes and 2 possible lane assignments for physical lanes 1 and 2) until a combination is found for which the calculated error code matches the VCRC.

A similar method may be applied to determine the lane parameters for 4× and 12× IB systems by counting the number of PAD symbols in the packet and using this to determine the physical lane identifier for the lane containing the End of Packet symbol. For example, in an 8× IB system the End of Packet symbol may be in physical lane 3 or physical lane 7. The End of Packet symbol will be in physical lane 7 unless the packet contains 4 PAD symbols (or indeed any PAD symbol) in which case will be in physical lane 3. Similarly, for a 12× IB system the End of Packet symbol will be in physical lanes 3, 7 or 11 as determined by the packet having 8, 4 or 0 PAD symbols respectively.

In principle the method of determining lane parameters may be carried out for a single (data or link) packet. For example, the information from a single packet may be processed in a computing device using software to step through each of the various combinations until agreement is found.

However, the applicant has found that a software-based system may take a significant time (seconds) on average to find a solution. In addition, it is possible that no solution can be found for an individual packet, for example if it has lost integrity during transmission (from the previous transmitting node) or during reception. In such cases a new packet is received and steps a) to h) repeated.

In a preferred embodiment of the present invention the alignment process is carried out by a FPGA. In this embodiment the error code is calculated and compared with the VCRC as normal when receiving an IB packet. If the calculated error code does not agree with the VCRC the FPGA is programmed to either reverse the lane assignment of physical lanes 1 and 2, or change the assigned lane polarity (for at least one lane). This new lane alignment is used to calculate an error code for the next packet received and to compare that with the VCRC for that packet and so on (repeating steps a) to h)) until the correct lane alignment is established.

This process is relatively fast and in principle should determine the correct lane order and polarity at least during receipt of around 32 packets. Typically, using an FPGA the correct lane alignment may be established, and monitoring started, within a few microseconds of receipt of the first packet.

Once agreement is found between the calculated error code and the VCRC for a packet the method of alignment is stopped and the lane assignments and polarities fixed. At this stage monitoring of the transmissions can begin.

Under normal operation of an IB system a validation check is carried out on each received packet to check the integrity of the contents of the packet. As each new packet is received an error code is calculated and compared with the VCRC for the packet. At some point a packet may be received for which the calculated error code does not agree with the VCRC. This is most likely to be due to a loss of integrity during transmission or reception, but could be caused by a change in lane alignment.

Although the lane alignment method of the present invention may be fast, especially when implemented on firmware, there is still a delay and a significant amount of information may be lost while lane alignment is re-established.

The present invention includes a method for re-establishing alignment of a plurality of transmission lanes when the number of consecutive packets received for which the calculated error code does not match the received error code exceeds a preset threshold value (typically 5 consecutive invalid packets).

Figure 3:
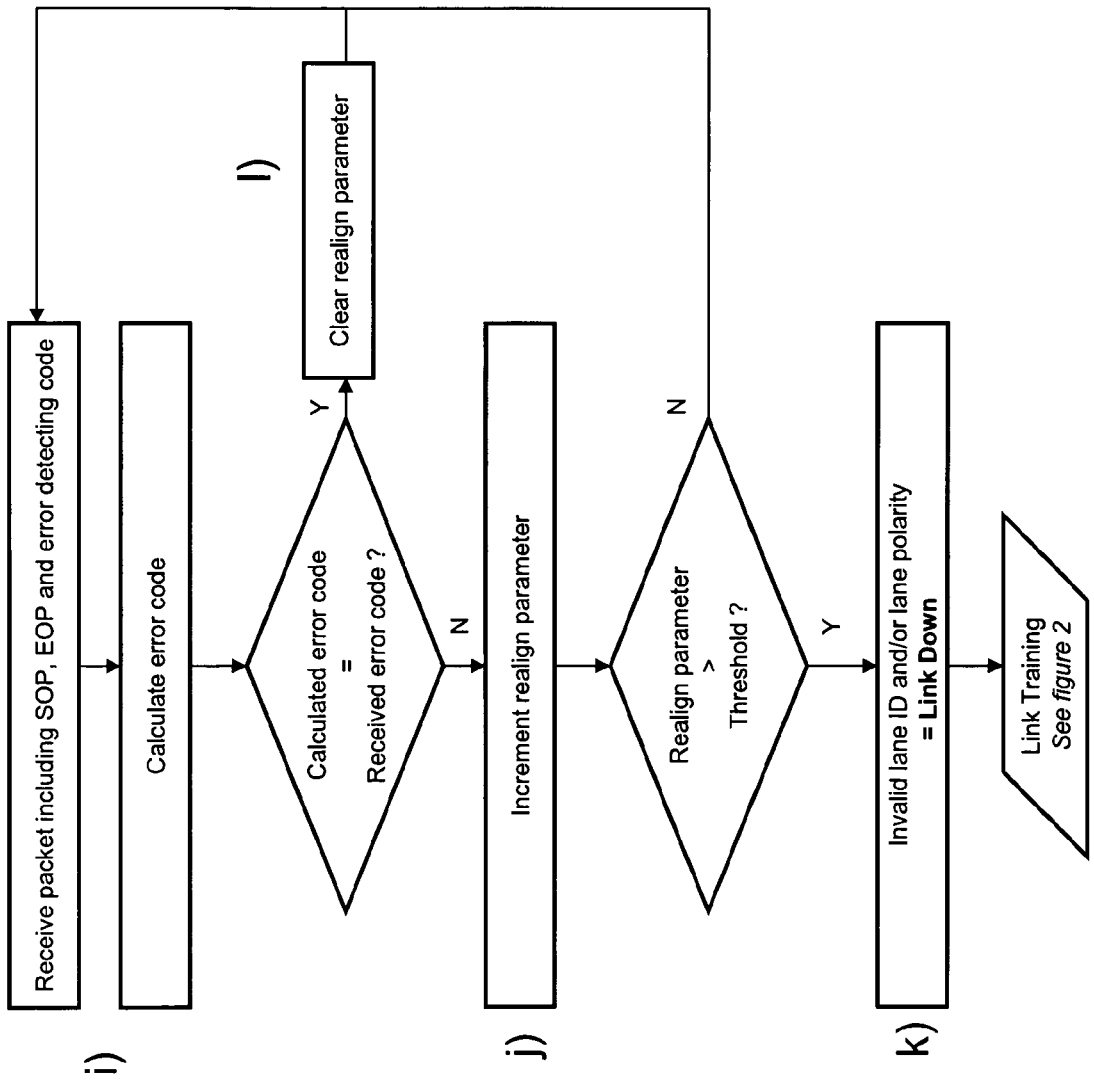
FIG. 3 shows a flow chart of the steps of another multi-lane alignment method according to an embodiment of the present invention.

A flow chart of the method is shown in FIG. 3. In step i) a packet is received which includes an SOP, EOP and VCRC. The error code is calculated and compared with the VCRC. If the calculated error code agrees with the VCRC then the realign parameter is set to zero, shown in FIG. 3 as step 1).

If the calculated error code does not agree with the VCRC then the realign parameter is incremented by 1 in step j) and the realign parameter is compared with the preset threshold value, typically 5. If the value of the realign parameter is greater than the preset threshold value then the lane parameters are reset using steps a) to h) of the method of determining the lane parameters as described above and shown in FIG. 2. Otherwise the method returns to step i) and the same process repeated for the following packet.

In this manner re-determination of the lane parameters only occurs following a sequence (5 in the present case) of invalid packets (ie., calculated and received error codes do not match) are received. This method avoids resetting of the lane parameters unless the link is down. Random invalid packets can occur from time to time, but the probability of 5 or more sequential invalid packets is small unless the lane parameters have changed.

Figure 4:
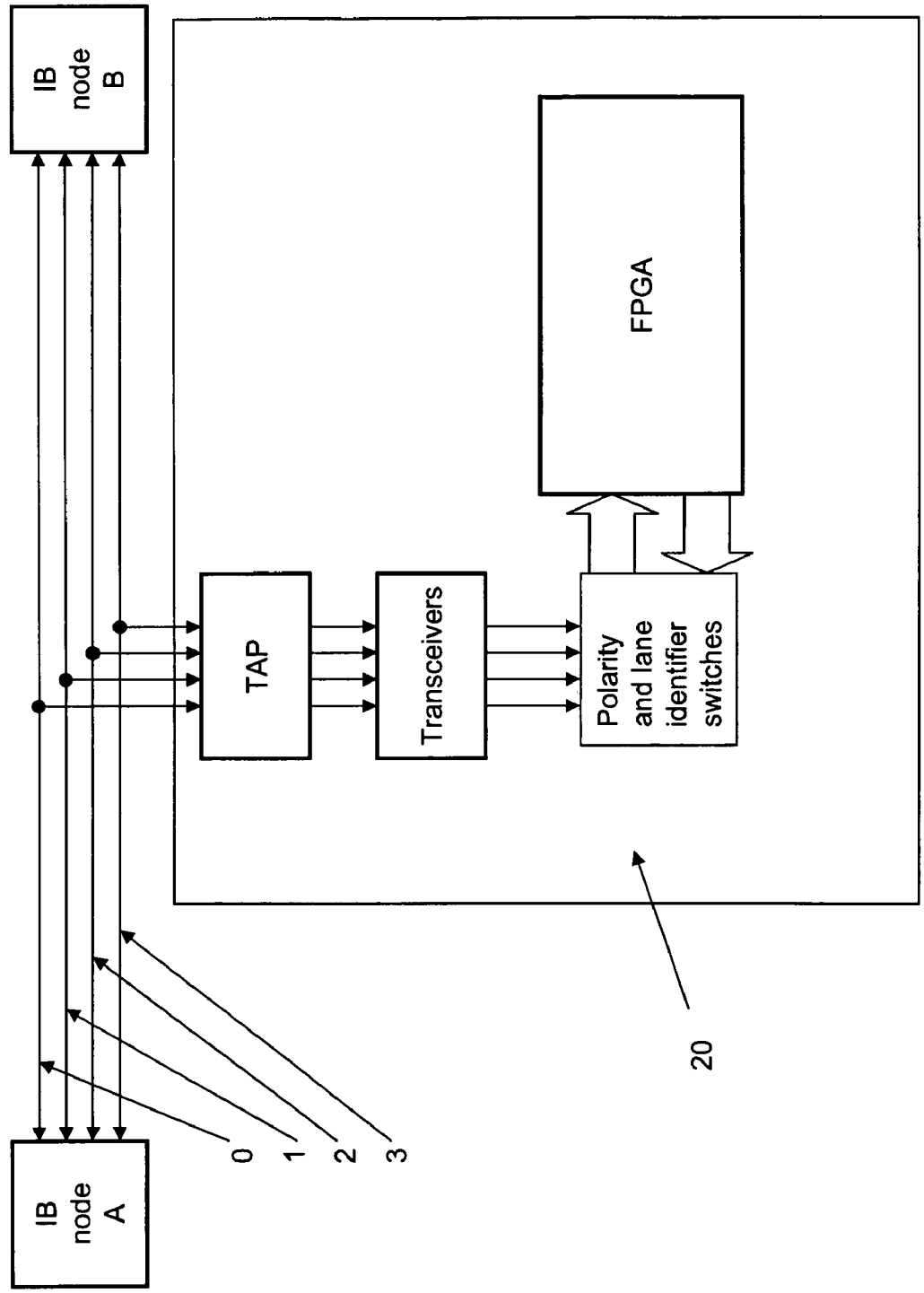
FIG. 4 shows a schematic view of a network device according to one embodiment of the present invention.

FIG. 4 shows a schematic view of a 4× IB link between an IB node A and an IB node B and connected to a computer network device (20). Data transmitted along each of the four lanes (indicated (arbitrarily) by lane identifiers 0-3) is read by a tap linked to the computer network device (20).

The FPGA in the computer network device (20) includes a switch configured to switch the lane identifier or polarity of data for each transmission lane. The switch settings for each transmission lane are controlled by firmware in the FPGA.

The network device is set up initially to one of the 384 (24×16) possible combinations of the lane identifiers and polarities for the four lanes. On receipt of the first package, transmitted SOP and EOP delimiters are detected by the FGPA and the lanes containing them identified as lanes 0 and 3 respectively in accordance with the 4× IB protocol. The FGPA is programmed to set the lane identifiers 0 and 3 to the physical lanes that contained SOP and EOP delimiters respectively.

The FGPA is further programmed to calculate the error code and to compare it with the received VCRC. If the calculated error code matches the VCRC for the packet then the lane parameters are correct (link up) and monitoring of further packets can commence. If the calculated error code does not match the VCRC then the FPGA is programmed to change the polarity setting for one of the lanes or the lane identifier for one of the remaining lanes (1 and 2) and this setting is used to receive the following packet.

The above process is repeated for each further packet received until a calculated error code for a packet matches the VCRC for that packet, after which the settings are fixed and normal monitoring can occur.

The above process for determination of the line parameters is repeated by the FPGA when a sequence of consecutive packets is received for which the calculated error code does not match the VCRC for each packet. In practice a sequence of 5 (or so) consecutive such packets is received before commencing the realignment of the lane parameters.

The present invention provides a number of advantages over the prior art, including the ability to establish the correct lane alignment and parity for each lane in a multi-lane parallel-serial link without requiring transmission of a training sequence. The corresponding lane alignment and polarity for each lane can be established relatively quickly, especially when implemented by firmware. Furthermore, the method is applicable to any number of lanes provided the protocol for transmitting the Start of Packet and End of Packet delimiters is known, and an error detecting code is transmitted with the packet. These provisos are likely to be met by any commercially available network architecture.

The method and apparatus of the present invention enable monitoring of a SAN to be established quickly without disturbance of the network.

Aspects of the present invention have been described by way of example only and it should be appreciated that modifications and additions may be made thereto without departing from the scope thereof of the appended claims.

What is claimed is:

1. A method of determining transmission lane parameters, including a physical lane identifier and polarity for each transmission lane, for a plurality of transmission lanes in a data transmission system, the method including the steps of:
    a) receiving a packet transmitted over the plurality of transmission lanes, the packet including a start of packet delimiter, an end of packet delimiter and an error detecting code;
    b) assigning a first lane identifier to the transmission lane that received the start of packet delimiter according to a preset protocol for the data transmission system;
    c) assigning a second lane identifier to the transmission lane that received the end of packet delimiter according to a preset protocol for the data transmission system;
    d) nominating a unique lane identifier to each of remaining transmission lanes;
    e) nominating a possible lane polarity to each of the transmission lanes;
    f) calculating an error code utilising the possible lane identifier and possible lane polarity nominated to the each of the transmission lane;
    g) comparing the calculated error code with the received error detecting code; and
    h) repeating steps d) to g) until the calculated error code matches the received error detecting code wherein on each iteration a nomination of at least one possible lane identifier or possible lane polarity is changed.

2. The method of claim 1 wherein step h) further includes repeating steps a) to c).

3. The method of claim 1 wherein the data transmission system includes a plurality of lanes in a parallel-serial architecture.

4. The method of claim 1 wherein there are four transmission lanes.

5. The method of claim 1 wherein the preset protocol requires the start of packet delimiter is transmitted in a prescribed transmission lane.

6. The method of claim 1 wherein the preset protocol requires the packet to have a length restricted to a multiple of four bytes.

7. The method of claim 1 wherein the error detecting code is a cycle redundancy check (CRC).

8. The method of claim 7 wherein the cycle redundancy check is a variant cycle redundancy check (VCRC).

9. A computer network device configured to monitor a plurality of transmission lanes in a data transmission system, the computer network device configured in use to:
    a) receive a packet transmitted over the plurality of transmission lanes, the packet including a start of packet delimiter, an end of packet delimiter and an error detecting code;
    b) assign a first lane identifier to a transmission lane that received the start of packet delimiter according to a preset protocol for the data transmission system;
    c) assign a second lane identifier to the transmission lane that received the end of packet delimiter according to a preset protocol for the data transmission system;
    d) nominate a unique possible lane identifier to each of the remaining transmission lanes;
    e) nominate a possible lane polarity to each of the transmission lanes;
    f) calculate an error code utilising the possible lane identifier and possible lane polarity nominated to each transmission lane; and
    g) compare the calculated error code with the received error detecting code; and change at least one possible lane identifier of the remaining transmission lanes or one possible lane polarity if the calculated error code does not match the received error detecting code.

10. The computer network device of claim 9 wherein the computer network device includes firmware.

11. The computer network device of claim 10 wherein the firmware is a Field Programmable Gate Array (FPGA).

12. A data transmission system having a plurality of transmission lanes including a computer network device configured in use to:

a) receive a packet transmitted over the plurality of transmission lanes, the packet including a start of packet delimiter, an end of packet delimiter and an error detecting code;
b) assign a first lane identifier to the transmission lane that received the start of packet delimiter according to a preset protocol for the data transmission system;
c) assign a second lane identifier to the reception lane that received the end of packet delimiter according to a preset protocol for the data transmission system;
d) nominate a unique possible lane identifier to each of the remaining transmission lanes;
e) nominate a possible lane polarity to each of the transmission lanes;
f) calculate an error code utilising the possible lane identifier and possible lane polarity nominated to each lane; and
g) compare the calculated error code with the received error detecting code; and change at least one possible lane identifier of the said remaining transmission lanes or one possible lane polarity if the calculated error code does not match the received error detecting code.

* * * * *